United States Patent
Otani et al.

(10) Patent No.: US 9,292,958 B2
(45) Date of Patent: Mar. 22, 2016

(54) IMAGE PROCESSING SYSTEM, GAME SYSTEM, IMAGE PROCESSING METHOD, IMAGE PROCESSING APPARATUS AND RECORDING MEDIUM

(71) Applicant: NINTENDO CO., LTD., Kyoto (JP)

(72) Inventors: Akira Otani, Kyoto (JP); Hiroyuki Kubota, Kyoto (JP); Daisuke Gotoh, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 68 days.

(21) Appl. No.: 13/733,589

(22) Filed: Jan. 3, 2013

(65) Prior Publication Data
US 2013/0210524 A1     Aug. 15, 2013

(30) Foreign Application Priority Data
Feb. 15, 2012 (JP) ................................. 2012-030914

(51) Int. Cl.
| | |
|---|---|
| G06T 15/00 | (2011.01) |
| G06T 15/20 | (2011.01) |
| G06T 19/00 | (2011.01) |
| A63F 13/40 | (2014.01) |
| G06F 3/0481 | (2013.01) |
| G06F 3/0485 | (2013.01) |

(52) U.S. Cl.
CPC .............. *G06T 15/00* (2013.01); *A63F 13/10* (2013.01); *G06F 3/0485* (2013.01); *G06F 3/04815* (2013.01); *G06T 15/20* (2013.01); *G06T 19/00* (2013.01); *A63F 2300/6684* (2013.01)

(58) Field of Classification Search
CPC .............. A63F 9/24; G06T 1/00; G06F 3/041
USPC ................................................. 463/31, 32, 33
See application file for complete search history.

(56) References Cited

U.S. PATENT DOCUMENTS

| | | | | |
|---|---|---|---|---|
| 5,830,066 | A | * | 11/1998 | Goden et al. .................... 463/33 |
| 7,002,578 | B1 | | 2/2006 | Ritter |
| 2002/0151361 | A1 | * | 10/2002 | Goden et al. .................... 463/33 |
| 2005/0020363 | A1 | * | 1/2005 | Kawamoto et al. ............. 463/32 |
| 2011/0039618 | A1 | * | 2/2011 | Ichiyanagi et al. ............. 463/31 |
| 2011/0039619 | A1 | * | 2/2011 | Kojima et al. .................. 463/31 |
| 2011/0279452 | A1 | | 11/2011 | Ibe et al. |

FOREIGN PATENT DOCUMENTS

| | | |
|---|---|---|
| JP | H7-129789 | 5/1995 |
| JP | 2002-543412 | 12/2002 |
| JP | 2003-344089 | 12/2003 |
| JP | 2011-258183 | 12/2011 |

* cited by examiner

*Primary Examiner* — Paul A D'Agostino
*Assistant Examiner* — Ankit Doshi
(74) *Attorney, Agent, or Firm* — Nixon & Vanderhye PC

(57) ABSTRACT

An example system includes: a field arrangement unit for positioning a field object in a three-dimensional virtual space; a viewpoint setting unit for setting a viewpoint in the virtual space so as to have an overhead viewpoint with respect to the field object; a scrolling unit for moving the viewpoint or the field object so as to change an area of the field object included in a range of vision on the basis of the viewpoint set by the viewpoint setting unit; a field deformation unit for deforming a shape of the field object such that a front side of the range of vision becomes flat while a back side of the range of vision is curved in a direction away from the viewpoint in accordance with a movement performed by the scrolling unit; and an image processing unit for generating a two-dimensional image displayed on a display unit.

18 Claims, 12 Drawing Sheets

IMAGE PROCESSING SYSTEM, GAME SYSTEM, IMAGE PROCESSING METHOD, IMAGE PROCESSING APPARATUS AND RECORDING MEDIUM

CROSS-REFERENCE TO RELATED APPLICATIONS

This application is based upon and claims the benefit of priority of the prior Japanese Patent Application No. 2012-030914, filed on Feb. 15, 2012, the entire contents of which are incorporated herein by reference.

FIELD

The present invention relates to an image processing system, a game system, an image processing method, an image processing apparatus and a computer program for performing image processing for displaying a three-dimensional virtual space on a display unit.

BACKGROUND AND SUMMARY

On a conventional game screen, a field viewed from overhead is displayed, in which a player character is positioned on the left side of the field while a non-player character (enemy character) is positioned on the right side thereof. The field is represented as a flat surface having a certain degree of depth, on which more than one characters are positioned. In accordance with the operation by the user, the player character moves on the field to make actions such as an attack, while the enemy character, in response to the attack, moves on the field to make actions such as a counterattack.

According to an aspect of the embodiment, an image processing system includes: a field arrangement unit for positioning a field object in a three-dimensional virtual space; a viewpoint setting unit for setting a viewpoint in the virtual space so as to have an overhead viewpoint with respect to the field object; a scrolling unit for moving the viewpoint or the field object so as to change an area of the field object included in a range of vision based on a viewpoint set by the viewpoint setting unit; a field deformation unit for deforming a shape of the field object such that a front side of the range of vision becomes flat while a back side of the range of vision is curved in a direction away from the viewpoint in accordance with a movement performed by the scrolling unit; and an image processing unit for generating a two-dimensional image displayed on a display unit based on the viewpoint.

The object and advantages of the invention will be realized and attained by means of the elements and combinations particularly pointed out in the claims.

It is to be understood that both the foregoing general description and the following detailed description are exemplary and explanatory, and are not restrictive of the invention.

DETAILED DESCRIPTION OF NON-LIMITING EXAMPLE EMBODIMENTS

An image processing system, a game system, an image processing apparatus and the like will specifically be described hereinbelow, taking a game machine as an example, with reference to the drawings illustrating embodiments thereof.

Embodiment 1

Figure 1:
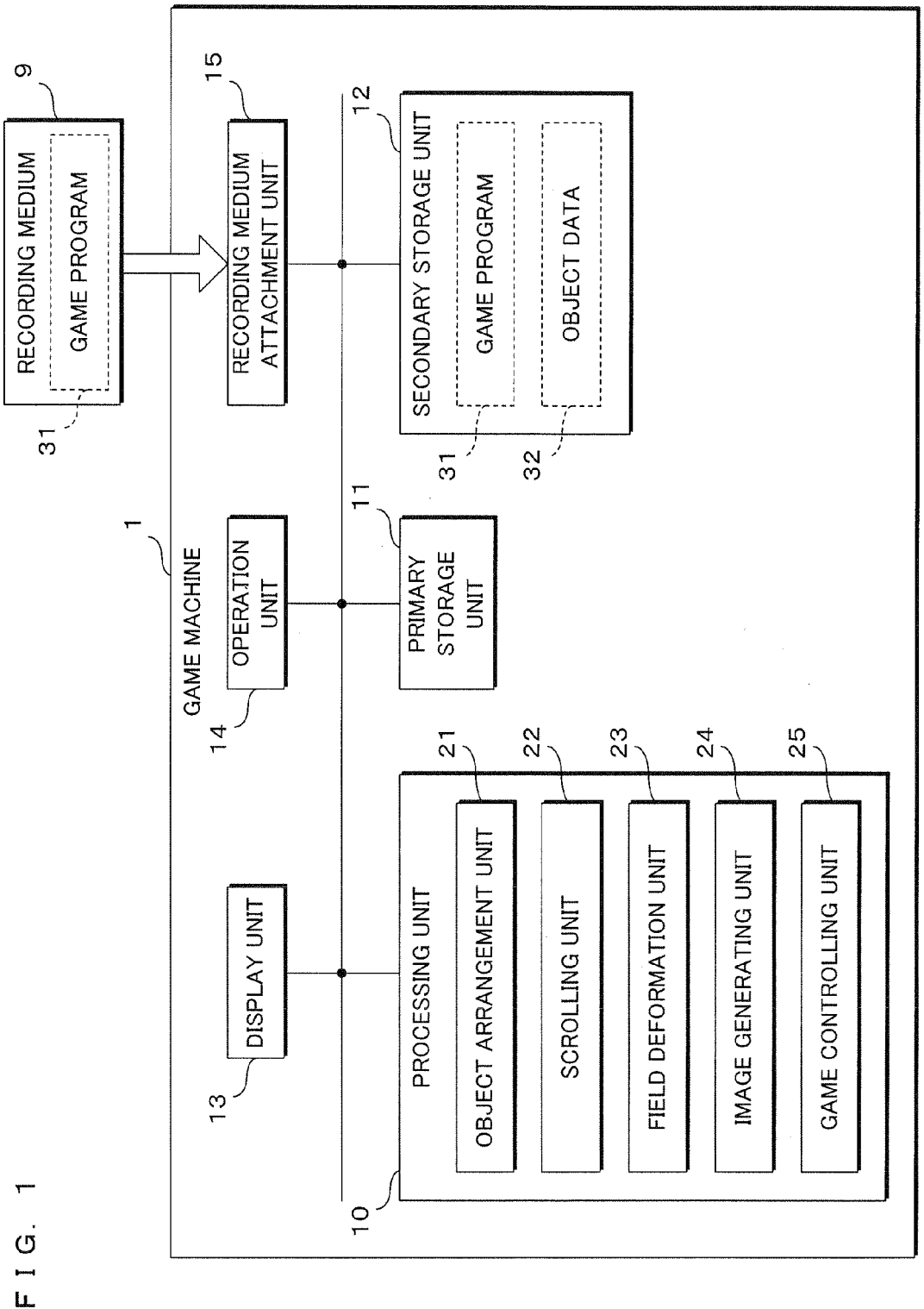
FIG. 1 shows an example non-limiting block diagram illustrating a configuration of a game machine according to an embodiment of the invention.

FIG. 1 shows an example non-limiting block diagram illustrating a configuration of a game machine according to an embodiment of the invention. A game machine 1 according to the present embodiment includes a processing unit 10 configured with an arithmetic processing unit such as a CPU (Central Processing Unit) or a MPU (Micro Processing Unit). The processing unit 10 reads out a game program 31 stored in a secondary storage unit 12 to a primary storage unit 11 and executes it, to perform various types of arithmetic processing for a game (e.g., processing for generating a game image displayed on a display unit 13, processing for determining an operation of a user performed on an operation unit 14 and processing for updating an image displayed on a display unit 13 in accordance with a content of operation).

The primary storage unit 11 is configured with a semiconductor memory device and the like. The primary storage unit 11 temporarily stores therein various types of data generated in association with the arithmetic processing performed by the processing unit 10. The secondary storage unit 12 is configured with a non-volatile storage device having a larger capacity compared to the primary storage unit 11. The secondary storage unit 12 stores therein the game program 31, object data 32 and the like.

The display unit 13 is formed with a liquid-crystal panel or the like to display an image sent from the processing unit 12. Moreover, the display unit 13 has a function of displaying a stereoscopic image. The stereoscopic image may be realized by any one of the naked eye system using parallax barrier or lenticular lens for example, or the glasses system using a polarization filter or the like.

The operation unit 14 is configured with various types of hardware keys or a touch-sensitive panel for accepting an operation by the user. The operation unit 14 notifies the processing unit 10 of the accepted operation. A recording medium attachment unit 15 is configured to attach or remove a recording medium 9 of a card type, a cassette type, a disk type or the like. The recording medium attachment unit 15 reads out the game program 31 or the like recorded in the attached recording medium 9 and stores it in the secondary storage unit 12.

The game machine 1 according to the present embodiment includes a function of displaying a game screen showing a three-dimensional virtual space on the display unit 13. The processing unit 10 reads out the object data 32 including polygon, texture and the like from the secondary storage unit 12 for three-dimensional image processing, and generates a two-dimensional image representing a three-dimensional virtual space viewed from one viewpoint. The generated two-dimensional image is sent to the display unit 13 by the processing unit 10, and thus a three-dimensional virtual space is displayed on the display unit 13.

As described above, the display unit 13 has a function of displaying a stereoscopic image. When a stereoscopic image is displayed, the processing unit 10 generates a pair of two-dimensional images obtained by viewing a three-dimensional virtual space from two different viewpoints. The processing unit 10 sends the generated pair of two-dimensional images to the display unit 13 as a left eye image (i.e. an image for a left eye) and a right eye image (i.e. an image for a right eye). The display unit 13 alternately displays the left eye image and the right eye image for each of horizontal lines or vertical lines, for example. The light emitted from the display unit 13, which is based on the left eye image and right eye image, is divided and enters the left eye and the right eye of the user. This realizes the stereoscopic image.

Image processing for a three-dimensional virtual space and control processing for a game are performed by, for example, an object arrangement unit 21, a scrolling unit 22, a field deformation unit 23, an image generating unit 24 and a game controlling unit 25 of the processing unit 10. The five blocks illustrated in FIG. 1 are software functional blocks that are implemented by the processing unit 10 executing the game program 31. A part or all of the five blocks, however, may also be implemented as hardware blocks.

Figure 2:
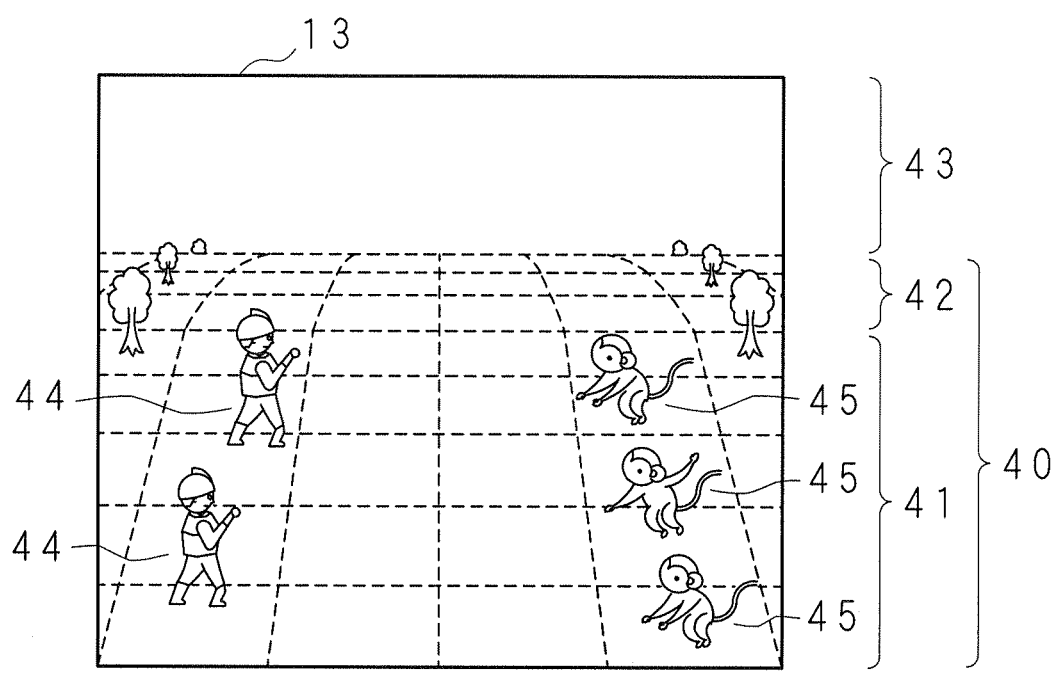
FIG. 2 shows an example non-limiting schematic view illustrating an example of an image of a three-dimensional virtual space displayed on a display unit by a game machine.

Next, the image processing for a three-dimensional virtual space performed by the game machine 1 according to the present embodiment will be described. FIG. 2 shows an example non-limiting schematic view illustrating an example of an image of a three-dimensional virtual space displayed on the display unit 13 by the game machine 1. In the illustrated example, a field 40 corresponding to a ground surface of the virtual space is displayed at the lower side, i.e. approximately two-third of the entire area of the display unit, while a background corresponding to a sky or the like is displayed at the upper side, i.e. approximately one-third of the entire area of the display unit 13. This is to display the three-dimensional virtual space seen from the overhead viewpoint with a virtual camera (not shown) positioned in the three-dimensional virtual space on the display unit 13.

The illustrated field 40 includes a flat portion 41 at the front side (the lower side of the image shown on the display unit 13 in the illustrated example), while a curved portion 42 is shown at the back (the upper side of the image). The flat portion 41 and the curved portion 42 in the field 40 are continuous. The curved portion 42 in the field 40 has an arc shape curved in a direction falling downward with respect to the surface of the flat portion 41 (in a direction away from a viewer). A player character 44, an enemy character 45 and the like in a game are positioned on the surface of the flat portion 41 of the field 40, which make actions such as a move or an attack in accordance with an operation by the user. In the illustrated example, two player characters 44 are positioned on the left side of the flat portion 41, while three enemy characters 45 are positioned on the right side thereof. Moreover, objects such as a tree, a rock or a structural object may be positioned either at the flat portion 41 or at the curved portion 42 in the field 40.

The game machine 1 performs processing for scrolling the field 40 toward the front direction or back direction in response to the user's operation, or to an event in the game regardless of the user's operation. The game machine 1 scrolls the field 40 such that the boundary between the flat portion 41 and the curved portion 42 in the field 40 does not change on the screen (the boundary position may, however, be moved to the front or back as needed). The characters, objects and the like that are positioned on the field 40 move in association with the scrolling of the field 40.

Figure 3:
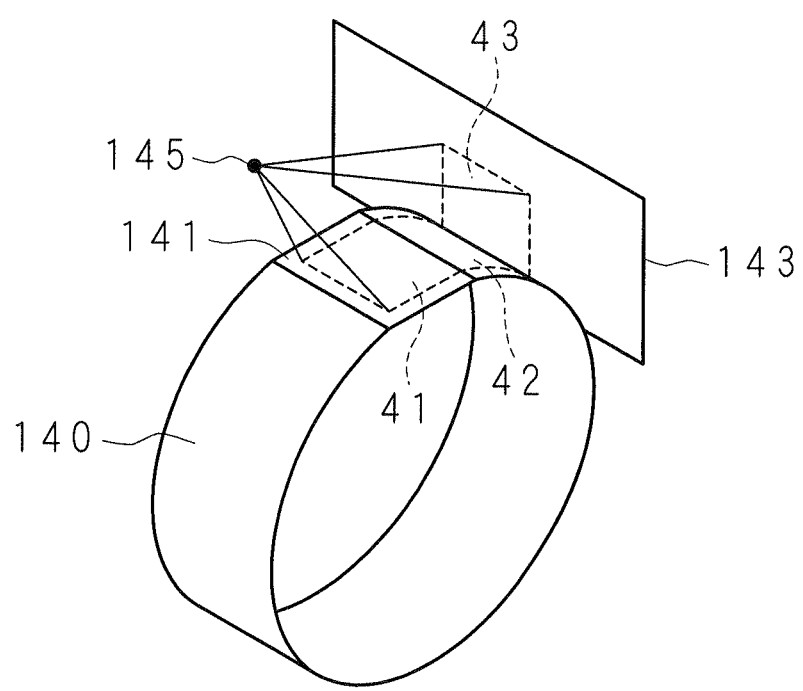
FIG. 3 shows an example non-limiting schematic view illustrating an example of a three-dimensional virtual space used by a game machine according to Embodiment 1.

FIG. 3 shows an example non-limiting schematic view illustrating an example of a three-dimensional virtual space used by the game machine 1 according to Embodiment 1. To display an image as shown in FIG. 2, the game machine 1 positions a field object 140, a background object 143, a virtual camera 145 and the like in the three-dimensional virtual space. The field object 140 is corresponding to the field 40 in FIG. 2, and is a three-dimensional object having a substantially cylindrical shape expressed with a model such as, for example, a polygon (or may be a polygonal tube formed by connecting several rectangular objects to be a loop). A texture image, such as a pattern of the ground surface, is attached to the outer circumferential surface of the field object 140. The player character 44, the enemy character 45 and the like are positioned on the outer circumferential surface.

The virtual camera 145 is for setting a position from which an object located in the three-dimensional virtual space is seen (a viewpoint), a viewing direction and a viewing range (range of vision), in order to display a three-dimensional virtual space on the display unit 13 as a two-dimensional image. The virtual camera 145 is positioned in the three-dimensional virtual space so as to overview a part of the outer circumferential surface on the field object 140 and bring it into view. In FIG. 3, the arrangement position (viewpoint) of the virtual camera 145 is indicated by a black dot, while the range of vision for the virtual camera 145 is indicated by a broken line. In the present example, the virtual camera 145 is positioned such that the horizontal direction of the range of vision approximately matches with the axial direction of the field object 140.

The background object 143 corresponds to the background 43 in FIG. 2. The background object 143 is an approximately rectangular image in which a sky, a mountain or the ocean is drawn for example. The background object 143 is positioned more toward the back than the field object 140 when viewed from the virtual camera 145, while a part thereof falls within the range of vision for the virtual camera 145. Note that the background object 143 is preferably positioned such that a part of the lower side thereof when viewed from the virtual camera 145 is covered by the field object 140.

Objects such as the field object 140, the background object 143, the virtual camera 145, a character and the like are positioned with respect to the three-dimensional virtual space by the object arrangement unit 21 included in the processing unit 10 of the game machine 1. The object arrangement unit 21 reads out the object data 32 stored in the secondary storage unit 12 to obtain data constituting the field object 140 and background object 143. The object arrangement unit 21 positions these objects so that they have a determined positional relationship. Moreover, the object arrangement unit 21 positions the virtual camera 145 in the three-dimensional virtual space to set a viewpoint, a range of vision and the like.

For example, the object arrangement unit 21 positions the field object 140 in the three-dimensional virtual space such that the axis of the field object 140 is in substantially the same direction as any one of the X axis, Y axis and Z axis in the three-dimensional virtual space. Moreover, the object arrangement unit 21 positions, for example, the virtual camera 145 at a position spaced from the outer circumferential surface of the field object 140 by a predetermined distance in a substantially perpendicular direction. The object arrangement unit 21 positions the background object 143 at a determined position with respect to the field object 140 and the virtual camera 145. For example, the object arrangement unit 21 sets the direction and the like of the virtual camera 145 such that the virtual camera 145 corresponds to an overhead viewpoint as shown in FIG. 2.

Figure 4:
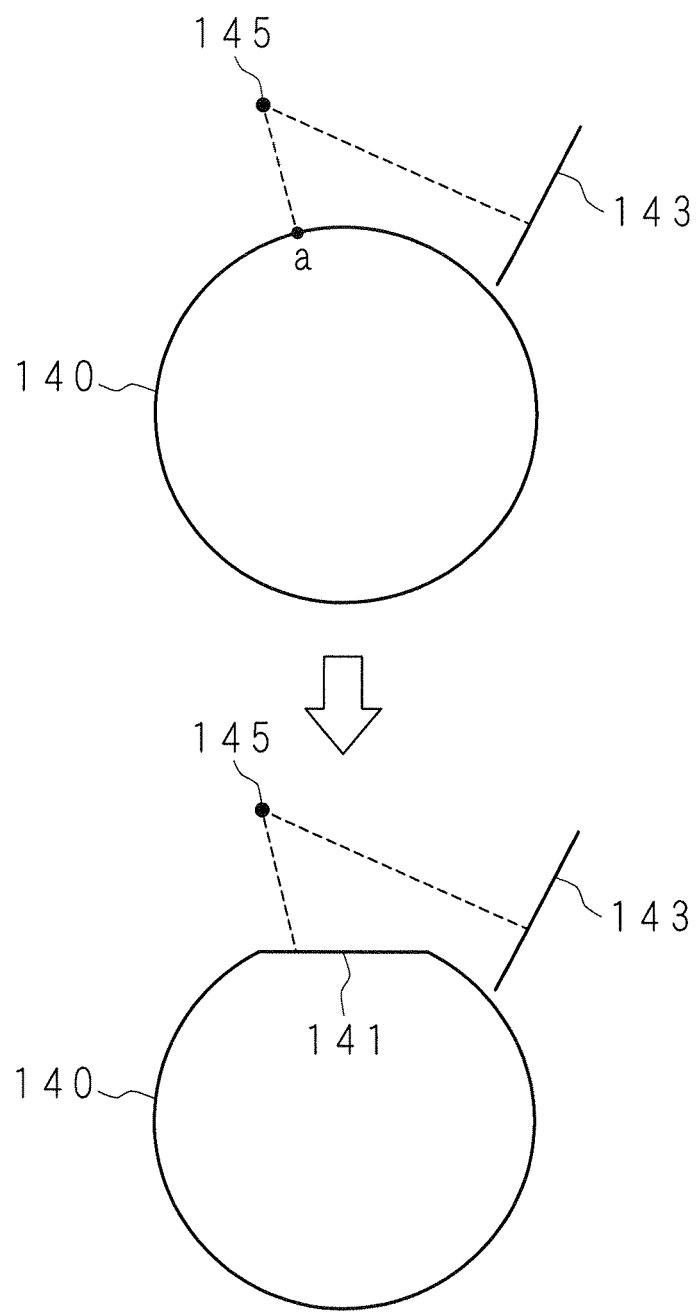
FIG. 4 shows an example non-limiting explanatory view related to deformation of a field object.

Furthermore, the field object 140 having a substantially cylindrical shape is provided with a flat portion 141 by deforming a part thereof to be flat in order to realize the flat portion 41 illustrated in FIG. 2. FIG. 4 shows an example non-limiting explanatory view related to deformation of the field object 140. The field object 140 stored in the secondary storage unit 12 as the object data 32 is a (non-deformed) substantially cylindrical object having no flat portion 141. The field object 140 may, however, alternatively store the (deformed) field object 140 having the flat portion 141.

When the object arrangement unit 21 positions the field object 140, the background object 143, the virtual camera 145 and the like in the three-dimensional virtual space, the range of vision for the virtual camera 145 is determined (see the upper section in FIG. 4). The field deformation unit 23 in the processing unit 10 deforms the field object 140 such that the front side (left side in FIG. 4) of the range of vision for the virtual camera 145 becomes flat, to obtain the flat portion 141 (see the lower section in FIG. 4). For example, the field deformation unit 23 calculates a position where the front end of the range of vision for the virtual camera 145 intersects with the field object 140 (see point "a" at the upper section in FIG. 4). The field deformation unit 23 can form the flat portion 141 by deformation over a predetermined range from this calculated position to the front or to the back.

Note that the field object 140 has a substantially cylindrical shape. Thus, when the flat portion 141 is provided by deformation, the back side (right side in FIG. 4) of the field object 140 in the range of vision for the virtual camera 145 has a shape curved in the direction away from the virtual camera 145.

After the field object 140 is deformed, the object arrangement unit 21 in the processing unit 10 positions objects such as the player character 44 and the enemy character 45 on the field object 140. The objects of these characters may be configured with data of, for example, a polygon model and a texture image. Alternatively, each object may be, for example, a so-called billboard in which an image including a character is arranged substantially perpendicular to the virtual camera 145. The object may also be configured in a form other than the ones described above. When, for example, an object of a character in a billboard is positioned, the field object 140 is deformed to provide the flat portion 141. This facilitates arrangement of objects with respect to the flat portion 141, increasing the speed of image processing.

The game controlling unit 25 in the processing unit 10 performs various kinds of control processing related to a game, including control for actions such as movement of or attack by a character in a flat portion 141 of the field object 140. The game controlling unit 25 performs various kinds of control processing in response to, for example, a game operation by the user accepted at the operation unit 14, including, for example, processing for moving the player character 44 on the field 40, processing for making the player character 44 attack the enemy character 45, processing for determining a success or a failure of an attack, and processing for displaying an effect image indicating a success or a failure of an attack.

The image generating unit 24 in the processing unit 10 generates a two-dimensional image in accordance with the range of vision for the virtual camera 145, i.e., performs so-called rendering. The processing method of rendering is an existing technique, and thus will not be described here in detail. The two-dimensional image generated by the image generating unit 24 is sent to the display unit 13 to be displayed. The two-dimensional image generated in accordance with the range of vision for the virtual camera 145 in the state shown in FIG. 3 and the lower section in FIG. 4 is displayed as shown in the example of FIG. 2. The flat portion 141 of the filed object 140 corresponds to the flat portion 41 of the field 40 in FIG. 2, while the curved surface at more toward the back than the flat portion 141 of the field object 140 corresponds to the curved portion 42 of the field 40 in FIG. 2. When a stereoscopic image is displayed on the display unit 13, the image generating unit 24 generates a pair of two-dimensional images for a left eye and for a right eye and sends them to the display unit 13.

Figure 5:
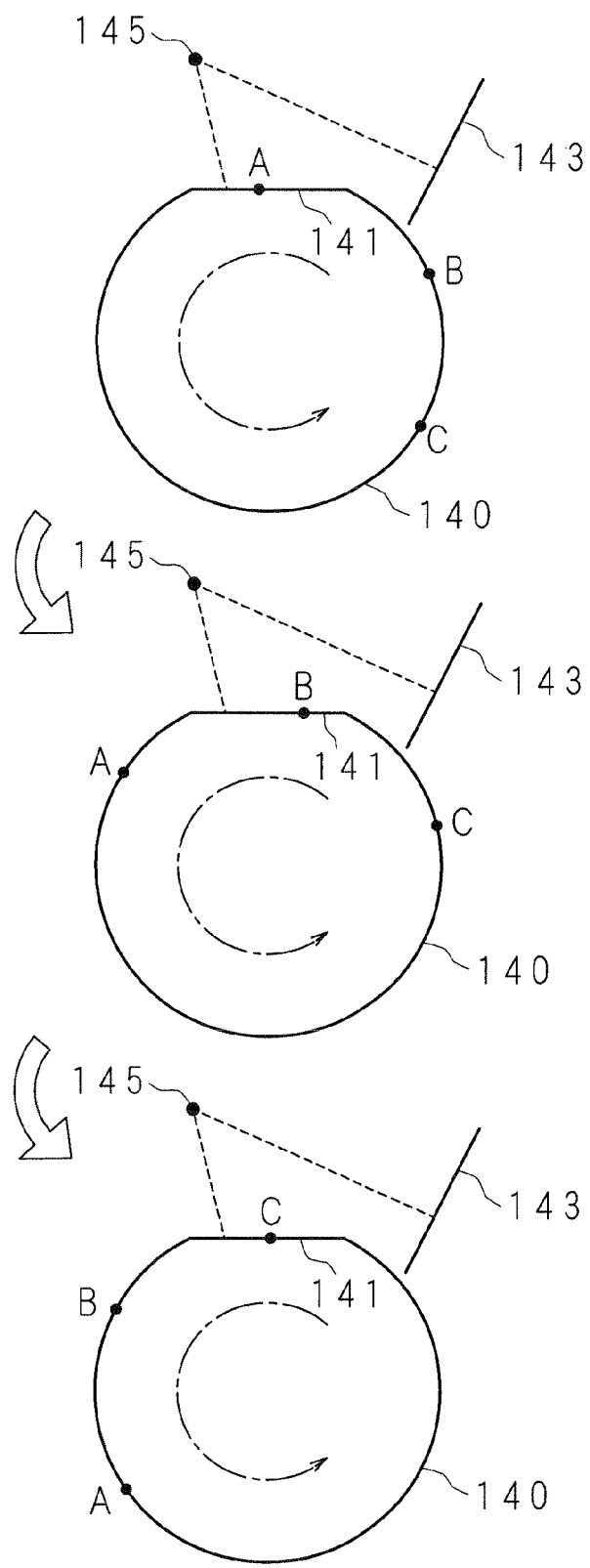
FIG. 5 shows an example non-limiting explanatory view related to scroll processing for a field.

Moreover, the game machine 1 performs processing for scrolling the field 40. FIG. 5 shows an example non-limiting explanatory view related to scroll processing for the field 40. The field 40 is scrolled by a method of moving the field object 140 or by a method of moving the virtual camera 145. Though an example where scrolling is realized by moving the field object 140 will be described below, the method of moving the virtual camera 145 may also be employed. Note that, when the virtual camera 145 is moved, the background object 143 needs to be moved together with the virtual camera 145.

The scrolling of the field 40 is performed at the scrolling unit 22 in the processing unit 10. The scrolling unit 22 determines the amount of scroll for the field 40 in accordance with an operation performed on the operation unit 14 or an event in a game. The scrolling unit 22 rotates the substantially cylindrical field object 140 arranged in the three-dimensional virtual space around its center of axle. In the illustrated example, the field object 140 is rotated from the back side to the front side in the range of vision for the virtual camera 145 (see the arrow of dashed-dotted line). The scrolling unit 22, however, can also rotate the field object 140 in the opposite direction.

Along with the rotation movement of the field object 140 by the scrolling unit 22, the field deformation unit 23 moves a deformation part of the field object 140. In other words, the field deformation unit 23 determines the deformation part with respect to the rotated field object 140 so as to have substantially the same position as that of the flat portion 141 with respect to the virtual camera 145, and deforms the field object 140. For example, the field deformation unit 23 may move the position of the flat portion 141 in the field object 140 to the direction opposite from the moving direction of the field object 140 moved by the scrolling unit 22 by substantially the same amount as the amount of movement for the field object 140 moved by the scrolling unit 22.

For example, in the example as illustrated in the top section in FIG. 5, a point A, a point B and a point C are arranged in the circumferential direction of the field object 140 (from front to back of the virtual camera 145) to be distant from one another at predetermined intervals. The point A is present at the flat portion 141, while the point B and the point C are present at the other curved portion. As the scrolling unit 22 rotates the field object 140 from the back to the front side of the virtual camera 145, the point A will be out of the range of vision for the virtual camera 145. When the point B comes in the range of vision for the virtual camera 145, the field deformation unit 23 moves the deformation position as shown in the middle section in FIG. 5. In other words, the field deformation unit 23 cancels deformation of the portion including the point A which is now out of the range of vision for the virtual camera 145 and sets the flat portion 141 thereof back to the curved surface, while deforming the portion including the point B which is now in the range of vision so as to form the flat portion 141 there.

Moreover, the scrolling unit 22 rotates the field object 140, to make the point B out of the range of vision for the virtual camera 145. Also when the point C falls in the range of vision for the virtual camera 145, the field object deformation unit 23 moves the position of deformation, as shown in the bottom section in FIG. 5. In other words, the field deformation unit 23 cancels deformation of the portion including the point B which is now out of the range of vision for the virtual camera 145 and sets the flat portion 141 thereof back to the curved surface, while deforming the portion including the point C which is now in the range of vision so as to form the flat portion 141 there.

As described above, the field deformation unit 23 moves the deformation position in accordance with the rotation of the field object 140 by the scrolling unit 22. This will not change the shape of the field in the range of vision for the virtual camera 145. Thus, the field 40 can be scrolled while maintaining the display manner of the display unit 13 as shown in FIG. 2.

If the substantially cylindrical field object 140 is not deformed by the field deformation unit 23 but is only rotated and scrolled by the scrolling unit 22, a game screen displayed on the display unit 13 will have a field with a curved surface also on the front side. Such a game screen may make the user feel uncomfortable, possibly making it difficult for the user to perform operation of a character positioned on the field. In the game machine according to the present embodiment, the field deformation unit 23 deforms the field object 140. This enables display of a game screen that can easily be seen and operated by the user without the above-described risks.

Figure 6:
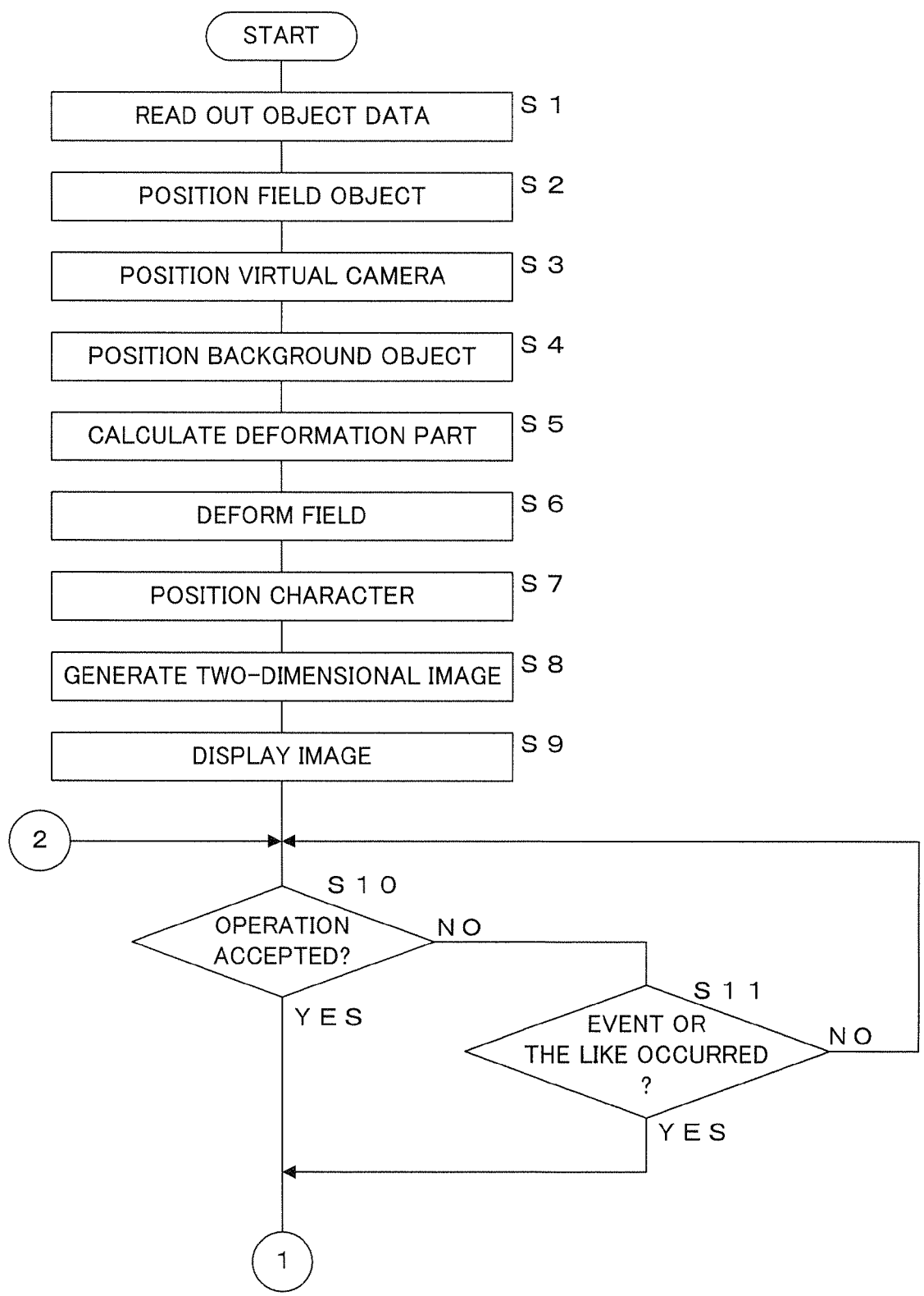
FIG. 6 shows an example non-limiting flowchart illustrating a procedure of processing performed by a game machine.
Figure 7:
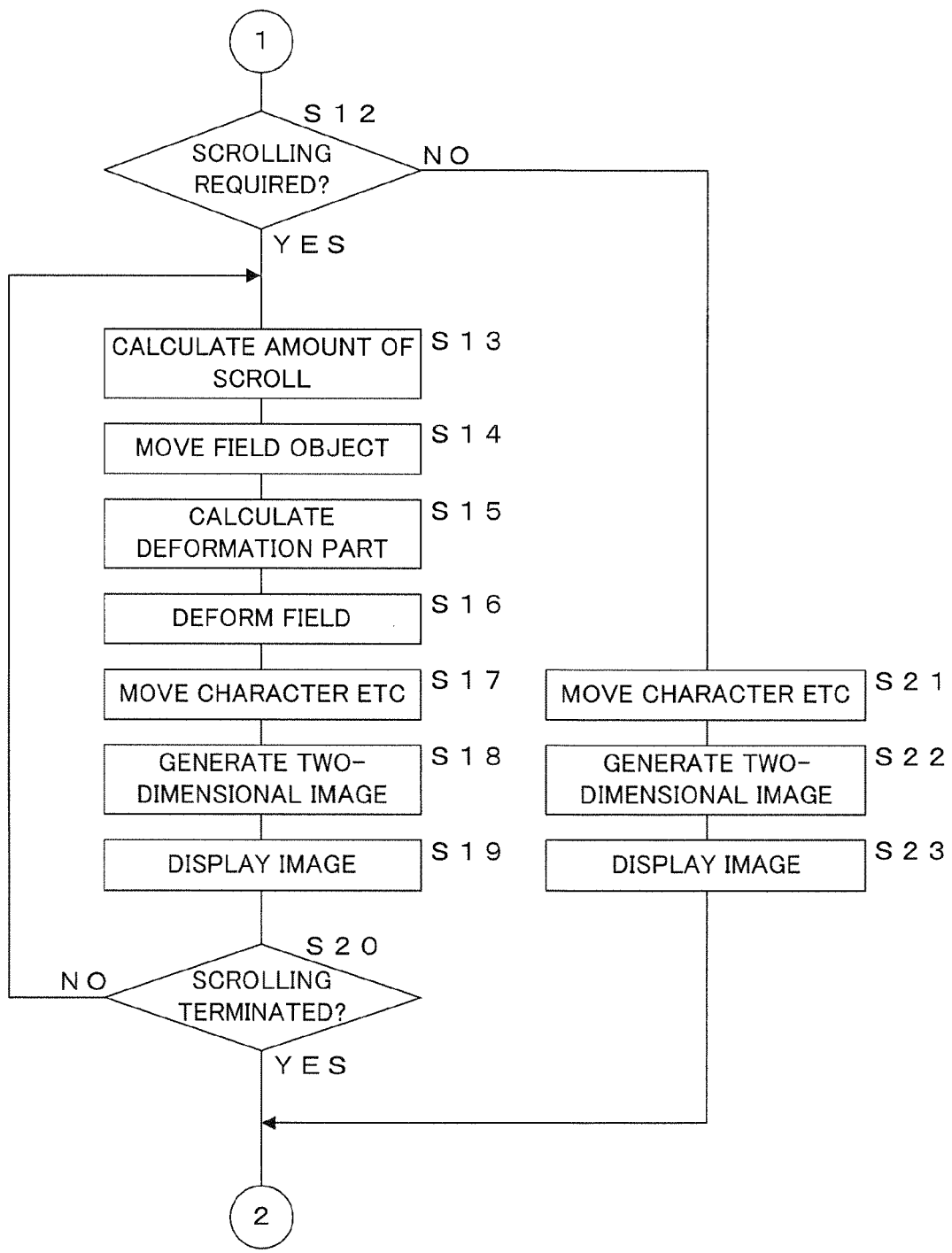
FIG. 7 shows an example non-limiting flowchart illustrating a procedure of processing performed by a game machine.

FIGS. 6 and 7 show an example non-limiting flowchart illustrating a procedure of processing performed by the game machine 1. The processing is performed by the processing unit 10 in the game machine 1 by executing the game program 31. First, the object arrangement unit 21 in the processing unit 10 reads out object data 32 stored in the secondary storage unit 12 (step S1), and positions the field object 140 included in the object data 32 in a three-dimensional virtual space (step S2). Furthermore, the object arrangement unit 21 in the processing unit 10 positions the virtual camera 145 (step S3) and a background object (step S4) in the three-dimensional virtual space.

Subsequently, the field deformation unit 23 in the processing unit 10 calculates the portion of deformation (the area in which deformation is performed) in the field object 140 based on, for example, the positional relationship between the field object 140 and the virtual camera 145 (step S5). The field deformation unit 23 in the processing unit 10 performs deformation of the field object for the calculated portion of deformation (step S6), and forms the flat portion 141 on the field object 140.

Next, the object arrangement unit 21 in the processing unit 10 positions objects such as the player character 44 and the enemy character 45 on the flat portion 141 of the field object 140 provided by deformation (step S7). The image generating unit 24 of the processing unit 10 generates a two-dimensional image which is formed by viewing the object of the three-dimensional virtual space positioned at the step 7 from the viewpoint of the virtual camera 145 (step S8). The image generating unit 24 in the processing unit 10 sends the generated two-dimensional image to the display unit 13 to display the image (step S9).

The processing unit 10 then determines whether or not an operation by the user is accepted by the operation unit 14 (step S10). It the operation is not accepted (S10: NO), the processing unit 10 further determines whether or not an event occurred that requires movement of a character or scroll of the field 40 in the procedure of the game (step S11). If no event occurred (S11: NO), the processing unit 10 returns the processing to step S10, and accepts an operation or waits until an event or the like occurs.

If an operation is accepted at the operation unit 14 (S10: YES) or if an event or the like occurred (S11: YES), the processing unit 10 further determines whether or not the field 40 needs to be scrolled (step S12). If it is determined that scroll is needed (S12: YES), the scrolling unit 22 in the processing unit 10 calculates the amount of scroll for the field 40 in accordance with the content of the accepted operation or the content of the event occurred (step S13). The scrolling unit 22 rotates the field object 140 in the scrolling direction according to the content of operation or event based on the calculated amount of scroll (step S14).

Next, the field deformation unit 23 in the processing unit 10 calculates a deformation portion in the field object 140 based on, for example, the positional relationship between the rotated field object 140 and the virtual camera 145 (step S15). The field deformation unit 23 in the processing unit 10 performs processing of deforming the field object 140 for the calculated deformation portion (step S16), to form the flat portion 141 at the field object 140.

Subsequently, the game controlling unit 25 in the processing unit 10 performs various kinds of control related to the game, such as movement of a character positioned on the field 40 (step S17). The image generating unit 24 in the processing unit 10 generates a two-dimensional image obtained by viewing an object in the three-dimensional virtual space, to which scrolling or the like has been performed at steps S13 through S17, from the viewpoint of the virtual camera 145 (step S18). The image generating unit 24 in the processing unit 10 displays an image by sending the generated two-dimensional image to the display unit 13 (step S19).

Thereafter, the processing unit 10 determines whether or not the scrolling of the field 40 is terminated (step S20). If it is determined that scrolling is not terminated, i.e. scrolling is continuously performed (S20: NO), the processing unit 10 returns the processing to step S13 and repeats the processing of steps S13 through S19. If it is determined that the scrolling is terminated (S20: YES), the processing unit 10 returns the processing to step S10 and waits until it accepts the next operation or an event occurs.

Moreover, if it is determined at step S12 that scrolling is not required (S12: NO), the game controlling unit 25 in the processing unit 10 performs various kinds of control related to the game such as movement of a character positioned on the field 40 (step S21). The image generating unit 24 in the processing unit 10 generates a two-dimensional image obtained by viewing an object in the three-dimensional virtual space, to which processing by the game controlling unit 25 is performed, from a viewpoint of the virtual camera 145 (step S22). The image generating unit 24 in the processing unit 10 sends the generated two-dimensional image to the display unit 13 to display an image (step S23), returns the processing back to step S10 and waits until it accepts the next operation or an event occurs.

In the game machine 1 according to Embodiment 1 with the configuration as described above, the field object 140 is positioned in the three-dimensional virtual space and the virtual camera 145 is positioned so as to have an overhead viewpoint with respect to the field object 140. The game machine 1 deforms the field object 140 such that the front side of the range of vision for the virtual camera 145 becomes flat while the back side thereof is curved in the direction away from the virtual camera 145. Thus, the display unit 13 shows the field 40 provided with the flat portion 41 at the front and the curved portion 42 at the back. The flat portion 41 of the field 40 may be used as a portion where objects such as the player character 44 and the enemy character 45 are positioned, allowing the game machine 1 to display a game screen on the display unit 13, which can easily be seen and operated by the user. Furthermore, when the player character 44, the enemy character 45 or the like is provided as an object such as a billboard, the object may easily be positioned on the flat portion 41. Moreover, the curved portion 42 of the field 40 can provide the user with such a visual effect that the field 40 further continues over the horizon for example, enabling effective expression of distance perspective in the field 40 regarding the front and the back.

Moreover, the game machine 1 rotates the substantially cylindrical field object 140 to scroll the field 40 to the front and to the back. Here, the game machine 1 moves the position of deformation at the field object 140 such that the front side of the field 40 displayed on the display unit 13 corresponds to the flat portion 41 while the back side thereof corresponds to the curved portion 42. Accordingly, the game machine 1 maintains the effect of providing the flat portion 41 as described above, while realizing the field 40 of a wide range extending to the front and to the back. When a stereoscopic image is shown on the display unit 13, it is easy for the user to sense the effect of the stereoscopic view in the field 40 wider to the front side and to the back side. Thus, the stereoscopic function of the game machine 1 can effectively be utilized. Moreover, the field object 140 is formed in the shape of a substantially cylindrical loop, so that the field 40 which is wide toward the front and back can easily be realized by rotation movement of the field object 140.

Though the present embodiment described the game machine 1 for example to explain the image processing system, game system, image processing apparatus and the like, application of the present embodiment is not limited to the game machine 1. For example, the present embodiment may be applied to a simulator such as a flight simulator or a drive simulator, or to other various kinds of systems and devices that perform image processing in three-dimensional virtual spaces. While the game machine 1 according to the present embodiment has a function of displaying a stereoscopic image on the display unit 13, it is not limited thereto. It is also possible for the game machine 1 not to have the function of displaying a stereoscopic image.

The display of the game screen is shown in FIG. 2 by way of a mere example but not of limitation. The shape, arrangement and the like of objects as shown in FIGS. 3 through 5 are also mere examples but are not limited thereto. Moreover, the flat portion 41 of the field 40 (flat portion 141 of the field object 140) does not need to be a completely flat surface, but may have irregularities, distortion and so forth. The flat portion 41 of the field 40 may also be a curved surface having a curvature smaller than that of the curved portion 42. Though the objects such as the player character 44 and the enemy character 45 are positioned at the flat portion 41 of the field 40, it is not limited thereto. These objects can also be placed at the curved portion 42 of the field 40. While the field object 140 has a substantially cylindrical shape, it is not limited thereto. Any loop shape may also be employed such as, for example, a polygonal cylinder or an oval cylinder.

(Modification)

Figure 8A:
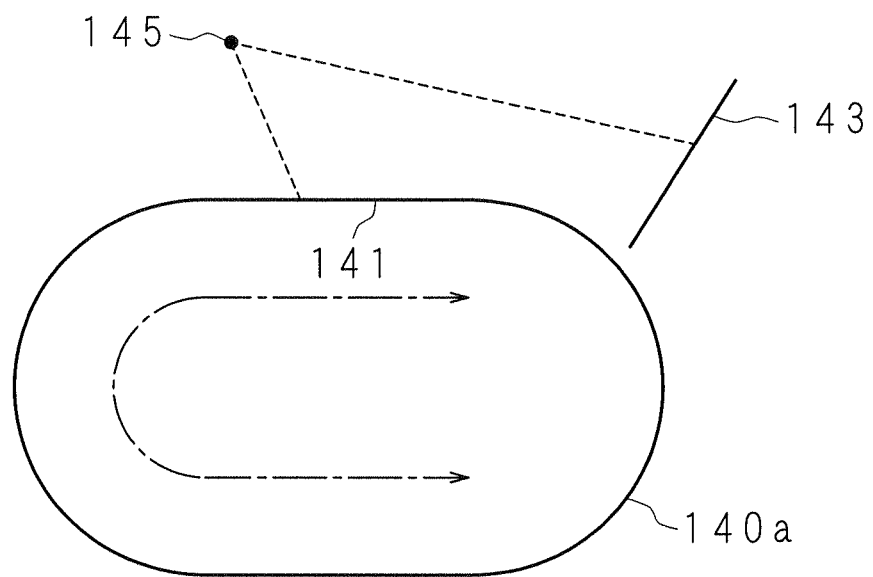
FIGS. 8A and 8B show example non-limiting schematic views illustrating other configuration examples for the field object.
Figure 8B:
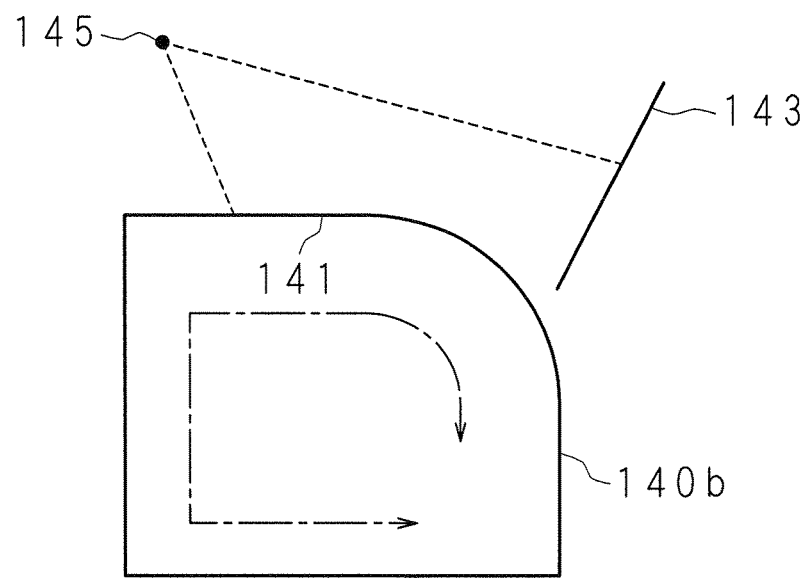

FIGS. 8A and 8B show example non-limiting schematic views illustrating other configuration examples for the field object, illustrating two shape examples of the field object when viewed from the side (axial direction of rotation). A field object 140a shown in FIG. 8A is a cylinder having an opening shape of a rectangle with rounded corners (the shape formed by connecting half circles with two straight lines). The field object 140a can use the portion corresponding to one straight line of the opening shape as the flat portion 41 (141), while using the half circle portion at the back as the curved portion 42 of the field 40. The field object 140a may be formed by, for example, connecting a plurality of objects with rectangular planes in a loop. The processing unit 10 deforms the shape of each rectangular plane object by the field deformation unit 23 while moving a plurality of rectangular plane objects along the illustrated opening shape by the scrolling unit 22, to scroll the field 40.

The field object 140b shown in FIG. 8B is a cylinder having an opening shape of a rectangle with one rounded corner. The field object 140b may use the rounded corner part as the curved portion 42 of the field 40 and the flat surface at the front side thereof as the flat portion 41 (141) of the field 40. The field object 140b may be formed by, for example, connecting a plurality of rectangular plane objects in a loop. The processing unit 10 deforms the shape of each rectangular plane object by the field deformation unit 23 while moving a plurality of rectangular plane objects along the illustrated opening shape by the scrolling unit 22, to scroll the field 40.

As described above, scroll by the scrolling unit 22 and deformation by the field deformation unit 23 may be performed such that the field object has a shape provided with the flat portion 41 at the front side of the range of vision for the virtual camera 145 and the curved portion at the back thereof. The field object outside the range of vision for the virtual camera 145 may have any shape as long as it has a loop shape.

Embodiment 2

Figure 9:
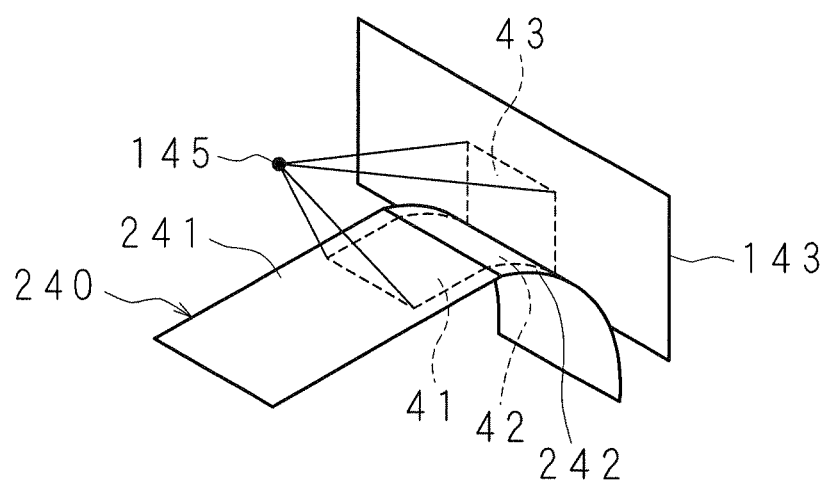
FIG. 9 shows an example non-limiting schematic view illustrating an example of a three-dimensional virtual space used by a game machine according to Embodiment 2.

In Embodiment 2, a method of displaying an image as in the game screen shown in FIG. 2 using a field object of a non-loop shape. FIG. 9 shows an example non-limiting schematic view illustrating an example of a three-dimensional virtual space used by the game machine 1 according to Embodiment 2. A field object 240 in Embodiment 2 corresponds to the field 40 in FIG. 2 and is a long substantially rectangular (band-like) planar object. The virtual camera 145 is placed at a position above and separated from the field object by a predetermined distance and directed obliquely downward in the longitudinal direction of the field object 240, so as to overview one surface of the field object 240 and bring it into view (see broken lines in FIG. 9). The field object 240 has a shape in which a part of a substantially band-like planar object is curved such that the front side in the range of vision for the virtual camera 145 serves as the flat portion 241 while the back side thereof serves as the curved portion 242. The background object 143 is positioned at more toward the back than the field object 240 when viewed from the virtual camera 145 such that a part thereof falls in the range of vision for the virtual camera 145.

Figure 10:
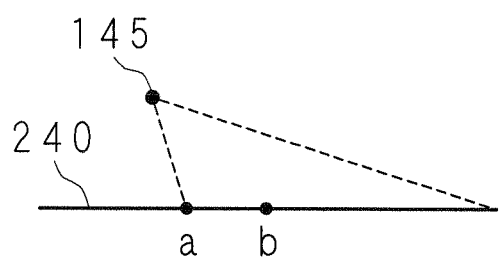
FIG. 10 is an example non-limiting explanatory view related to deformation of a field object according to Embodiment 2.
Figure 10:
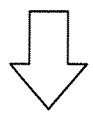
Figure 10:
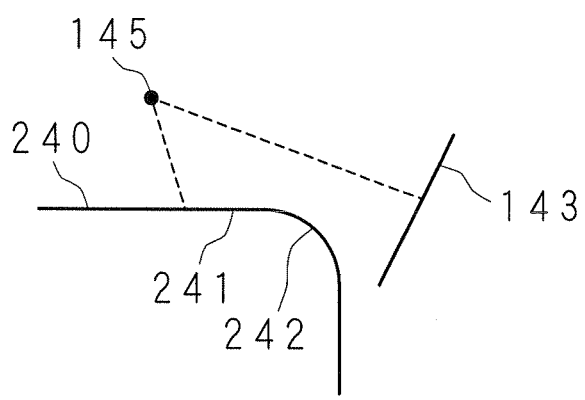

Objects such as the field object 240, background object 143, virtual camera 145 and the like are positioned with respect to the three-dimensional virtual space by the object arrangement unit 21 in the processing unit 10. The deformation as illustrated for the band-like field object 240 is performed by the field deformation unit 23 in the processing unit 10. FIG. 10 is an example non-limiting explanatory view related to deformation of the field object 240 according to Embodiment 2. The field object 240 stored as the object data 32 in the secondary storage unit 12 is a (planar) substantially band-like object having no curved portion 242. The field object 240 may store the field object 240 having the curved portion 242.

When the object arrangement unit 21 positions the field object 240, the virtual camera 145 and the like in the three-dimensional virtual space, the range of vision for the virtual camera 145 is determined (see the upper section in FIG. 10). The field deformation unit 23 in the processing unit 10 is provided with the curved portion 242 obtained by deforming the field object 240 such that the back side of the range of vision for the virtual camera 145 (right side in FIG. 10) is curved in a direction away from the virtual camera 145 (see the lower section in FIG. 10). For example, the field deformation unit 23 calculates a position at which the front end of the range of vision for the virtual camera 145 intersects with the field object 240 (see point "a" in the upper section of FIG. 10), and calculates a position separated from the position of the point "a" by a predetermined distance toward the back (see point "b" in the upper section of FIG. 10). The field deformation unit 23 may provide the curved portion 242 by performing deformation, i.e. bending a portion more toward the back than the point "b" in the field object 240. Moreover, the portion between the point "a" and the point "b" in the field object 240 will be the flat portion 241.

The object arrangement portion 21 positions objects such as the player character 44, enemy character 45 and the like on the flat portion 241 in the field object 240 which is deformed by the field deformation unit 23. Moreover, the game machine 1 scrolls the field 40 by the scrolling unit 22 in the processing unit 10.

Figure 11:
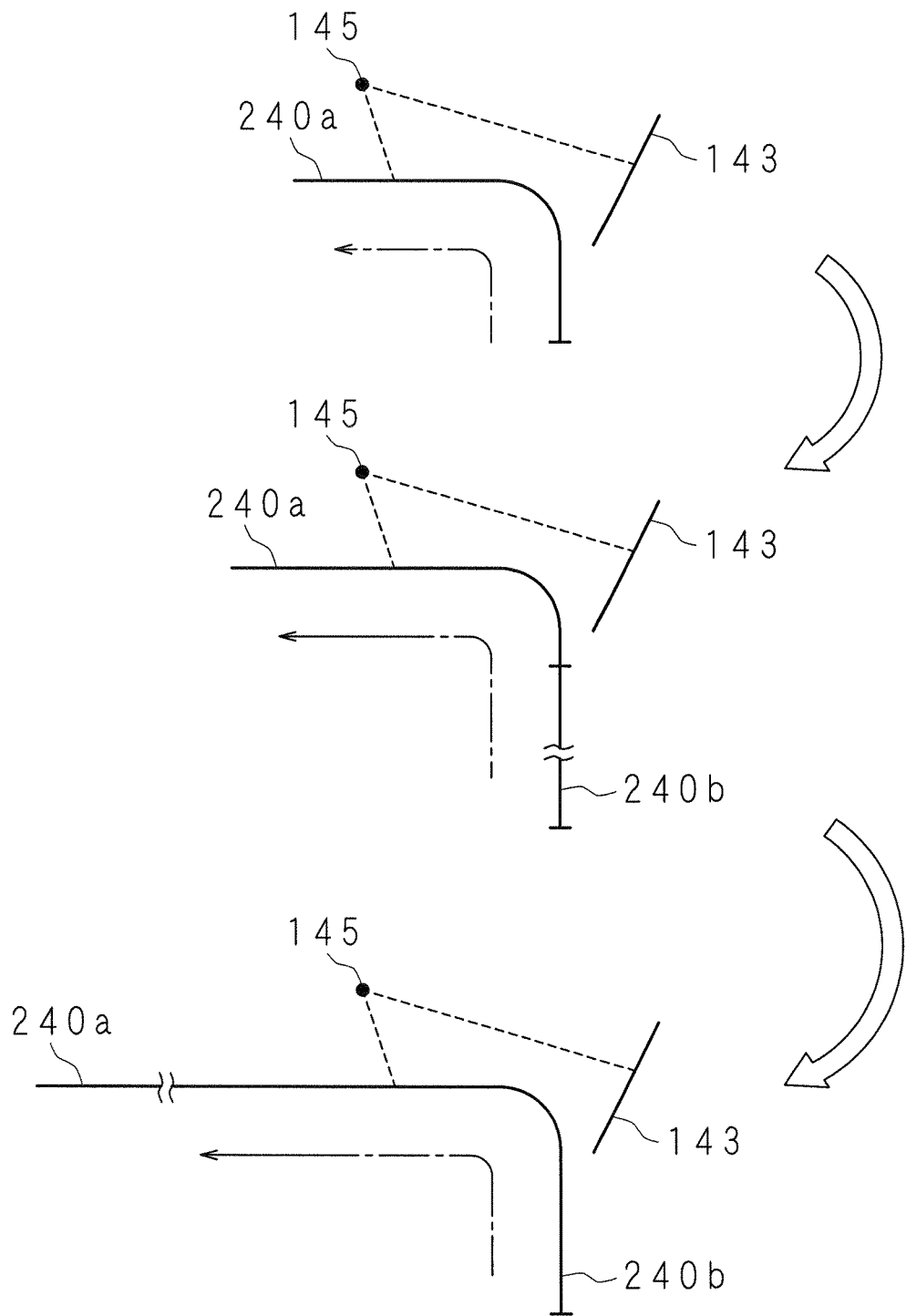
FIG. 11 is an example non-limiting explanatory view related to scroll processing for a field according to Embodiment 2.

FIG. 11 is an example non-limiting explanatory view related to scroll processing for the field 40 according to Embodiment 2. The scrolling unit 22 determines the amount of scroll for the field 40 in response to an operation performed on the operation unit 14 and an event in a game. The scrolling unit 22 moves the substantially band-like field object 240a positioned in the three-dimensional virtual space in the longitudinal direction along with its surface. In the illustrated example, the filed object 240a is moved from the back to the front (see the arrow of dashed-dotted line) in the range of vision for the virtual camera 145 (see the top section in FIG. 11). The scrolling unit 22 may, however, move the field object 240a in the opposite direction.

Since the field object 240 in Embodiment 2 does not have a loop-like shape, continuous scrolling would make the end of the field object 240a in the longitudinal direction reach the end of the range of vision for the virtual camera 145. Thus, when or before the end of the field object 240a reaches the end of the range of vision for the virtual camera 145, the object arrangement unit 21 reads out the next field object 240b stored in the secondary storage unit 12. The object arrangement unit 21 positions the next field object 240b at an end of the field object 240a (see the middle section in FIG. 11). The next field object 240b read out from the secondary storage unit 12 by the object arrangement unit 21 may be the same as or different from the previous field object 240a. The next field object 240b is decided, for example, in accordance with the content of a game controlled by the game controlling unit 25.

The scrolling unit 22 moves the two field objects 240a and 240b together to scroll the field 40. When the scrolling unit 22 further continues scrolling, the field object 240a moves out of the range of vision for the virtual camera 145. Thus, when or after the field object 240a is moved out of the range of vision for the virtual camera 145 (see the bottom section in FIG. 11), the object arrangement unit 21 deletes the field object 240a from the three-dimensional virtual space.

Figure 12:
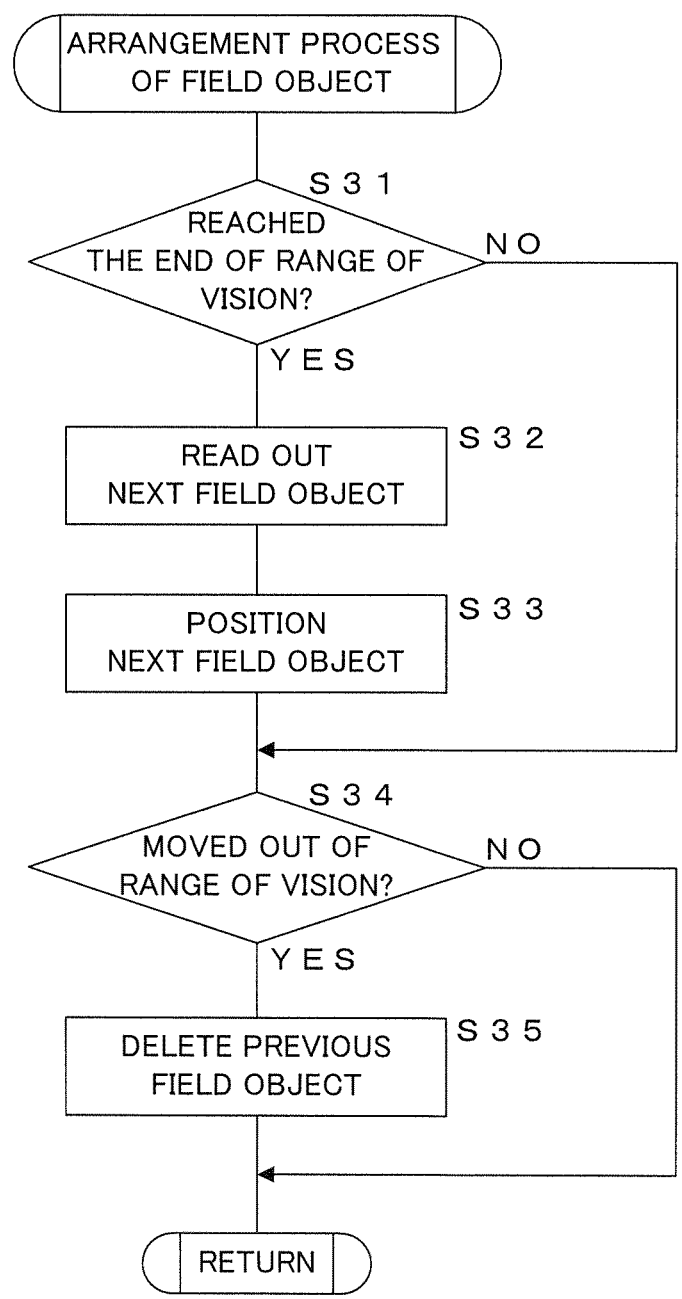
FIG. 12 is an example non-limiting flowchart illustrating a procedure of arrangement processing for a field object in association with the scrolling of a field.

FIG. 12 is an example non-limiting flowchart illustrating a procedure of arrangement processing for the field object 240 in association with the scrolling of the field 40. The processing is performed by the object arrangement unit 21 in the processing unit 10. Note that the processing unit 10 in the game machine 1 according to Embodiment 2 performs processing as shown in FIG. 12, for example, between the steps S14 and S15 in FIG. 7, in addition to the processing as illustrated in FIGS. 6 and 7. The processing as shown in FIG. 12 will be described here, while other processing procedures will not be described since they are similar to those in the game machine 1 according to Embodiment 1.

When the field 40 is scrolled, the processing unit 10 in the game machine 1 according to Embodiment 2 calculates the amount of scroll and moves the field object 240. Thereafter, the processing unit 10 determines whether or not this movement makes an end of the field object 240 reach an end of the range of vision for the virtual camera 145 (step S31). If the end of the field object 240 does not reach the end of the range of vision for the virtual camera 145 (S31: NO), the processing unit 10 proceeds to step S34.

When the end of the field object 240 reaches the end of the range of vision for the virtual camera 145 (S31: YES), the processing moves on to step S32. The object arrangement portion 21 in the processing unit 10 reads out the next field object 240 subsequent to the current field object 240 from the object data 32 stored in the secondary storage unit 12 (step S32). The object arrangement unit 21 positions the read-out next field object 240 continuously at the end of the field object 240 that reached the end of the range of vision for the virtual camera 145 (step S33) and proceeds to step S34.

Moreover, the processing unit 10 determines whether or not the field object 240 has moved out of the range of vision for the virtual camera 145 along with the scroll of the field 40 (step S34). If the field object 240 has moved out of the range of vision for the virtual camera 145 (S34: YES), the object arrangement unit 21 in the processing unit 10 deletes the field object 240 that has moved out of the range of vision for the virtual camera 145 from the three-dimensional virtual space (step S35), and terminates the processing. If the field object 240 has not moved out of the range of vision for the virtual camera 145 (S34: NO), the processing unit 10 terminates the processing. The processing unit 10 which terminated the arrangement process for the field object 240 associated with scrolling performs, for example, deformation of the field object 240, game processing such as movement of characters, generation processing for a two-dimensional image based on the range of view for the virtual camera 145, and display processing of the generated image on the display unit 13.

The game machine 1 according to Embodiment 2 with the configuration described above positions the non-loop field object 240 in the three-dimensional virtual space. The game machine 1 moves the field object 240 when scrolling the field 40. Moreover, when or before the end of the field object 240 reaches the end of the range of vision for the virtual camera 145, the game machine 1 positions the next field object 240 at the end of the field object 240. Because the game machine 1 repeatedly moves and positions the field object 240, even the non-loop field object 240 can realize the field 40 of a wide range. In addition, the field object 140 of the loop-like shape repeats the field 40 having the same color, pattern, shape or the like by scrolling. The non-loop field object 240 may position field objects 240 having different colors, patterns, shapes or the like in turn to allow display of different kinds of fields 40.

Furthermore, the game machine 1 deletes the field object 240 that has moved out of the range of vision for the virtual camera 145 along with the movement of the field object 240. This can prevent a waste in hardware resources such as a storage capacity of the primary storage unit 11 or a processing ability of the processing unit 10 in the game machine 1 due to unnecessary field object 240.

Though the present embodiment described that the curved portion 242 is provided by deforming the planar field object 240, it is not limited thereto. For example, the field object 240 curved in a circular arc may be stored as the object data 32 and the flat portion 241 may be provided by deforming the field object 240 in response to scrolling. Furthermore, the field object 240 may have another shape, while the flat portion 241 and the curved portion 242 may be provided by deformation. The embodiment described above can display a field of a wide range appropriate for the purpose of image processing by deforming the shape of a field object in response to scrolling. In the embodiment, the shape of the field object is deformed such that the front side of the range of vision for the virtual camera is made flat while the back side thereof is curved in a direction away from the virtual camera. This can realize a field of a wide range by scrolling. The flat portion at the front can be utilized as a main part in which characters act. The curved portion at the back allows distance perspective to be effectively expressed. The expression of distance perspective toward the front and back is preferable for a stereoscopic view.

Since the other configuration parts of the game machine 1 according to Embodiment 2 are similar to those of the game machine 1 according to Embodiment 1, similar parts are denoted by the same reference numbers and will not be described in detail.

What is claimed is:

1. An image processing system including a display and at least one computer processor, the image processing system being configured to perform operations comprising:
    positioning a field object in a three-dimensional virtual space;
    setting a viewpoint in the virtual space so as to have an overhead viewpoint with respect to the field object;
    moving the viewpoint or the field object so as to change an area of the field object included in a range of vision on the basis of the set viewpoint;
    deforming a shape of the field object such that at a front side of the range of vision the field object is flat and at a back side of the range of vision the field object is curved in a direction away from the viewpoint in accordance with a movement of the viewpoint or the field object; and
    generating a two-dimensional image displayed on the display based on the viewpoint.

2. The image processing system according to claim 1, wherein
    the field object has a loop-like shape, and
    the image processing system is further configured to perform operations comprising:
        moving the viewpoint or the field object in a loop direction, and
        deforming a part of the field object in the loop-like shape such that at the front side of the range of vision the field object is flat.

3. The image processing system according to claim 1, wherein
    the field object includes a plurality of planar objects, and
    the image processing system is further configured to perform operations comprising:
        moving the viewpoint or the planar objects in a direction along a surface of one of the planar objects,
        positioning another one of the planar objects at an end of a destination of said one of the planar objects in accordance with the movement of the viewpoint or the planar objects, and
        deforming a shape of one or more planar objects included in the range of vision such that at the front side of the range of vision the one or more planar objects are flat while at the back side of the range of vision the one or more planar objects are curved in a direction away from the viewpoint.

4. The image processing system according to claim 3, wherein the image processing system is further configured to delete a planar object positioned on a side opposite to the destination in accordance with the movement of the viewpoint or the planar objects.

5. The image processing system according to claim 1, wherein the image processing system is further configured to set a viewpoint by positioning a virtual camera in the virtual space.

6. The image processing system according to claim 1, wherein the image processing system is further configured to perform operations comprising:
    positioning a character object at a flat portion of the field object; and
    controlling the character object on the flat portion.

7. The image processing system according to claim 1, wherein the image processing system is further configured to position a background object further than the field object when viewed from the viewpoint.

8. The image processing system according to claim 1, wherein the image processing system is further configured to:
    generate an image for a stereoscopic view based on the viewpoint.

9. A game system, comprising:
    the image processing system according to claim 1; and
    an operation receiver configured to accept an operation related to a game, wherein
    movement of the viewpoint or the field object is performed in response to the operation accepted by the operation receiver.

10. The image processing system according to claim 1, wherein the two-dimensional image includes the flat portion and the curved portion of the deformed field object.

11. An image processing system including at least one computer processor, the image processing system being configured to perform operations comprising:
    positioning a field object in a three-dimensional virtual space;
    setting a viewpoint in the virtual space;
    moving the viewpoint or the field object so as to change an area of the field object included in a range of vision on the basis of the set viewpoint;
    deforming a shape of the field object in accordance with the movement of the viewpoint or the field object, wherein the area of the field object in the range of vision is deformed to have a flat portion and a curved portion that is curved in a direction away from the viewpoint in the virtual space; and generating a two-dimensional image displayed on a display based on the range of vision.

12. An image processing method, comprising:

a field arrangement step of positioning a field object in a three-dimensional virtual space;

a viewpoint setting step of setting a viewpoint in the virtual space so as to be an overhead viewpoint with respect to the field object;

a scrolling step of moving the viewpoint or the field object so as to change an area of the field object included in a range of vision on the basis of the set viewpoint; and a field deformation step of deforming a shape of the field object such that at a front side of the range of vision the field object is flat and at a back side of the range of vision the field object is curved in a direction away from the viewpoint in accordance with the movement performed by the scrolling step.

13. An image processing apparatus, comprising a computer processor and being configured at least to:

position a field object in a three-dimensional virtual space;

set a viewpoint in the virtual space so as to have an overhead viewpoint with respect to the field object;

move the viewpoint or the field object so as to change an area of the field object included in a range of vision on the basis of the set viewpoint;

deform a shape of the field object such that at a front side of the range of vision the field object is flat and at a back side of the range of vision the field object is curved in a direction away from the viewpoint in accordance with the movement of the viewpoint or the field object; and generate a two-dimensional image displayed on a display based on the viewpoint.

14. The image processing apparatus according to claim 13, wherein the field object has a loop-like shape, and the image processing apparatus is further configured to:

move the viewpoint or the field object in a loop direction, and deform a part of the field object in the loop-like shape such that at the front side of the range of vision the field object is flat.

15. The image processing apparatus according to claim 13, wherein the field object includes a plurality of planar objects, and the image processing apparatus is further configured to:

move the viewpoint or the planar objects in a direction along a surface of one of the planar objects, position another one of the planar objects at an end of a destination of said one of the planar objects in accordance with the movement of the viewpoint or the planar objects, and deform a shape of one or more planar objects included in the range of vision such that at the front side of the range of vision the one or more planar objects are flat and at the back side of the range of vision the one or more planar objects are curved in a direction away from the viewpoint.

16. A non-transitory recording medium having stored therein an image processing program which, when executed by a computer of an image processing apparatus including a display, controls the image processing apparatus to at least:

position a field object in a three-dimensional virtual space;

set a viewpoint in the virtual space so as to have an overhead viewpoint with respect to the field object;

move the viewpoint or the field object so as to change an area of the field object included in a range of vision on the basis of the set viewpoint;

deform a shape of the field object such that at a front side of the range of vision the field object is flat and at a back side of the range of vision the field object is curved in a direction away from the viewpoint in accordance with the movement of the viewpoint or the field object; and generating a two-dimensional image displayed on the display based on the viewpoint.

17. The non-transitory recording medium according to claim 16, wherein the field object has a loop-like shape, and the processing program controls the image processing apparatus to at least:

move the viewpoint or the field object in a loop direction, and deform a part of the field object in the loop-like shape such that at the front side of the range of vision the field object is flat.

18. The non-transitory recording medium according to claim 16, wherein the field object includes one or more planar objects, and the processing program further controls the image processing apparatus to:

move the viewpoint or the planar objects in a direction along a surface of one of the planar objects, position another one of the planar objects at an end of a destination of said one of the planar objects in accordance with the movement of the viewpoint or the planar objects, and deform a shape of one or more planar objects included in the range of vision such that at the front side of the range of vision the one or more planar objects are flat and at the back side of the range of vision the one or more planar objects are curved in a direction away from the viewpoint.

* * * * *